United States Patent
Osumi et al.

(10) Patent No.: US 10,436,282 B2
(45) Date of Patent: Oct. 8, 2019

(54) DAMPER DEVICE

(71) Applicant: AISIN SEIKI KABUSHIKI KAISHA, Kariya-shi, Aichi-ken (JP)

(72) Inventors: Tomoya Osumi, Nagoya (JP); Tomohiro Saeki, Anjo (JP); Nobuki Fukaya, Takahama (JP); Daisuke Hayashi, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 281 days.

(21) Appl. No.: 15/464,978

(22) Filed: Mar. 21, 2017

(65) Prior Publication Data
US 2017/0276211 A1 Sep. 28, 2017

(30) Foreign Application Priority Data
Mar. 23, 2016 (JP) .................................. 2016-059230

(51) Int. Cl.
  *F16F 15/123* (2006.01)
  *F16D 13/64* (2006.01)
(52) U.S. Cl.
  CPC ........ *F16F 15/12326* (2013.01); *F16D 13/64* (2013.01); *F16F 15/12333* (2013.01)
(58) Field of Classification Search
  CPC .......... F16F 15/12326; F16F 15/12333; F16D 13/64
  USPC ...... 464/68.92; 192/205; 267/170, 172, 178, 267/179
  See application file for complete search history.

(56) References Cited

U.S. PATENT DOCUMENTS

| | | |
|---|---|---|
| 5,626,518 A | 5/1997 | Maki et al. |
| 2008/0237955 A1 | 10/2008 | Oono et al. |
| 2012/0244953 A1 | 9/2012 | Mizuta |
| 2012/0322565 A1 | 12/2012 | Nishitani |

FOREIGN PATENT DOCUMENTS

JP  H8-42592 A  2/1996

OTHER PUBLICATIONS

The extended European Search Report dated Aug. 16, 2017, by the European Patent Office in corresponding European Patent Application No. 17161650.1. (9 pgs).

*Primary Examiner* — Greg Binda
(74) *Attorney, Agent, or Firm* — Buchanan Ingersoll & Rooney PC

(57) ABSTRACT

A damper device includes: a pressing plate; a rotation plate disposed to oppose the pressing plate; an elastic member elastically linking the pressing and rotation plates, and in which bending is generated when relative twist of the pressing and rotation plates is generated; and seats provided on both end surfaces of the elastic member The seat has a projected surface, the pressing plate has a recessed surface corresponding to the projected surface, the seats and the pressing plate come into surface-contact with each other in a case where the relative twist is not generated, one seat and the pressing plate come into surface-contact with each other, and a void is formed between the other seat and the pressing plate, in a case where the relative twist is generated, and the void increases as an angle of the relative twist increases.

2 Claims, 7 Drawing Sheets

DAMPER DEVICE

CROSS REFERENCE TO RELATED APPLICATIONS

This application is based on and claims priority under 35 U.S.C. § 119 to Japanese Patent Application 2016-059230, filed on Mar. 23, 2016, the entire contents of which are incorporated herein by reference.

TECHNICAL FIELD

This disclosure relates to a damper device which is used in a clutch disk or the like.

BACKGROUND DISCUSSION

Japanese Patent No. 3381396 discloses a damper device of the related art which is used in a clutch disk or the like. The damper device elastically links a flanged hub and a plate disposed around a hub of the flanged hub to oppose a flange of the flanged hub via a spring in the circumferential direction, and transmits an input from the plate side to the flanged hub side via the spring while buffering by bending contraction of the spring.

In the damper device of the related art, there is a problem that a unintentional hysteresis torque that is different from that is predicted at the time of designing is generated in rotary vibration absorption in the vicinity of a part at which the spring starts to bend as a rotational speed increases.

As a result of studies of the inventors assiduously in consideration of the problem, it was found that surface sliding is generated between the flange and a seat and the surface sliding causes the unintentional hysteresis torque when the flange of the flanged hub is repeatedly pressed to and separated from the seat of an end surface of the spring, in the rotary vibration absorption in the vicinity of the part at which the spring starts to bend.

Thus, a need exists for a damper device which is not susceptible to the drawback mentioned above.

SUMMARY

A damper device according to an aspect of this disclosure includes: a pressing plate; a rotation plate which is disposed to oppose the pressing plate; an elastic member which elastically links the pressing plate and the rotation plate in a circumferential direction, and in which bending is generated in a case where relative twist of the pressing plate and the rotation plate is generated; and a pair of seats which is provided on both end surfaces in the circumferential direction of the elastic member, in which the seat has a projected surface which protrudes in the circumferential direction on the pressing plate side, in which the pressing plate has a recessed surface that corresponds to the projected surface, in which an outer diameter side part of the projected surface of each of the pair of the seats and an outer diameter side part of the recessed surface of the pressing plate come into surface-contact with each other in a case where the relative twist is not generated, in which the outer diameter side part of the projected surface of one seat and the outer diameter side part of the recessed surface of the pressing plate come into surface-contact with each other, and a void is formed between the outer diameter side part of the projected surface of the other seat and the outer diameter side part of the recessed surface of the pressing plate, in a case where the relative twist is generated, and in which the void increases as an angle of the relative twist increases.

BRIEF DESCRIPTION OF THE DRAWINGS

The foregoing and additional features and characteristics of this disclosure will become more apparent from the following detailed description considered with the reference to the accompanying drawings, wherein:

FIG. 2 is a view describing a side on which both ends in a case where relative twist of the flange and a disk plate is not generated, and the flange in a case where the relative twist is generated press the seat.

FIG. 3 is a view describing a side on which the flange in a case where the relative twist of the flange and the disk plate is generated does not press the seat (in addition, the disk plate is not illustrated in the drawing, but the disk plate comes into contact with the seat in this case).

FIG. 4 is a view describing a side on which the flange in a case where the relative twist of the flange and the disk plate is the maximum angle does not press the seat.

FIG. 5 is a view describing a side on which both ends in a case where the relative twist of the flange and the disk plate is not generated, and the flange in a case where the relative twist is generated press the seat.

FIG. 6 is a view describing a side on which the flange in a case where the relative twist of the flange and the disk plate is generated does not press the seat (in addition, the disk plate is not illustrated in the drawing, but the disk plate comes into contact with the seat in this case).

DETAILED DESCRIPTION

Hereinafter, the embodiment of the disclosure will be described in detail with reference to the attached drawings. In addition, the embodiment which will be described hereinafter illustrates an example in a case where the embodiment disclosed here is realized, and the embodiment disclosed here is not limited to the specific configuration which will be described hereinafter. In realizing the embodiment disclosed here, the specific configuration which corresponds to the embodiment may be appropriately employed.

Figure 1:
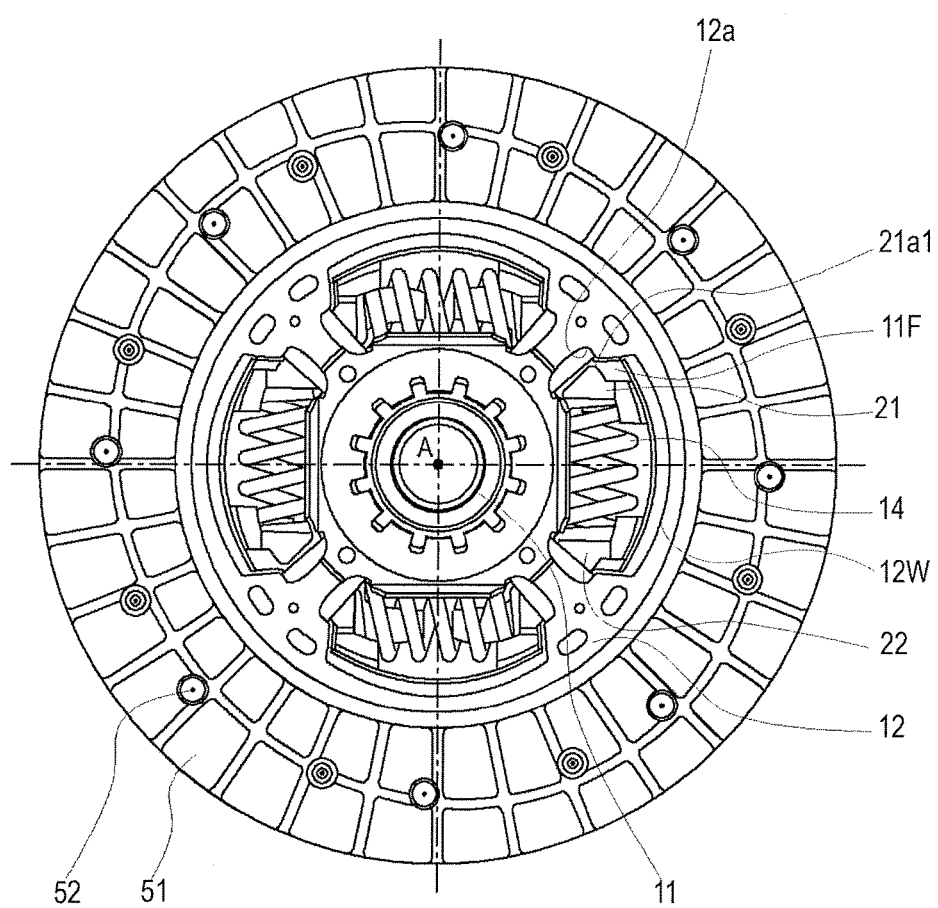
FIG. 1 is a schematic plan view of a damper device according to one embodiment of the disclosure.
Figure 2:
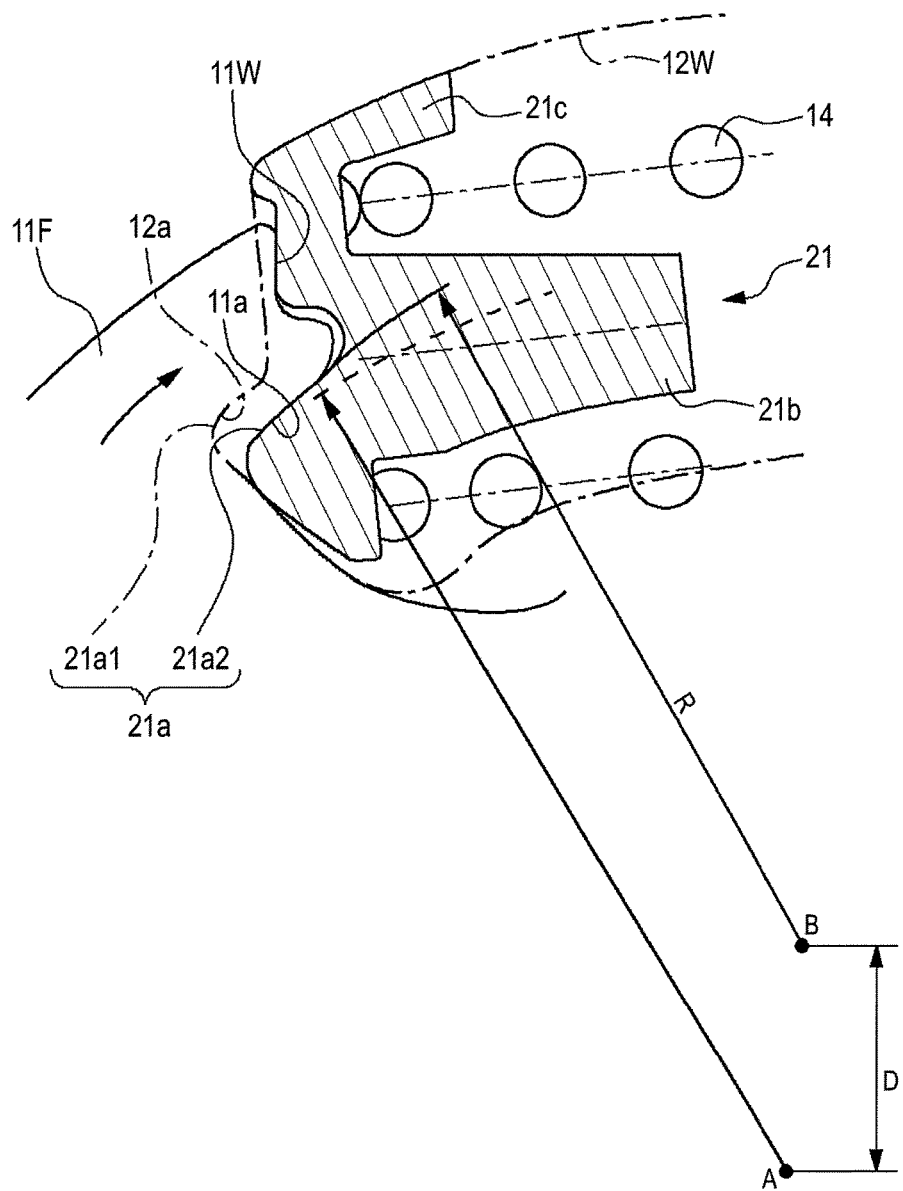
FIG. 2 is a view illustrating a positional relationship between a seat and a flange in which the damper device illustrated in FIG. 1 is cut by a plane at which the flange of a flanged hub is positioned and a part of the section is enlarged.
Figure 3:
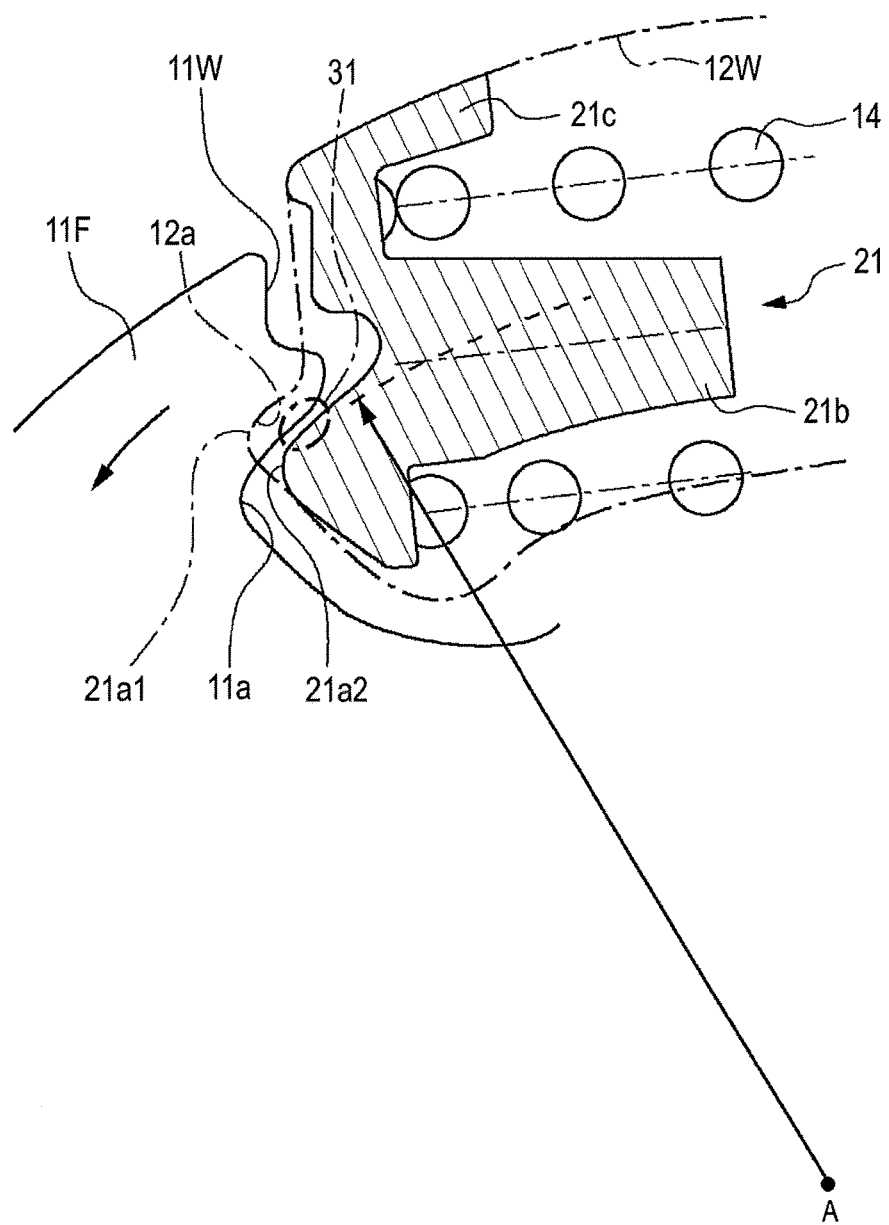
FIG. 3 is a view illustrating a positional relationship between the seat and the flange in which the damper device illustrated in FIG. 1 is cut by a plane at which the flange of the flanged hub is positioned and a part of the section is enlarged.
Figure 4:
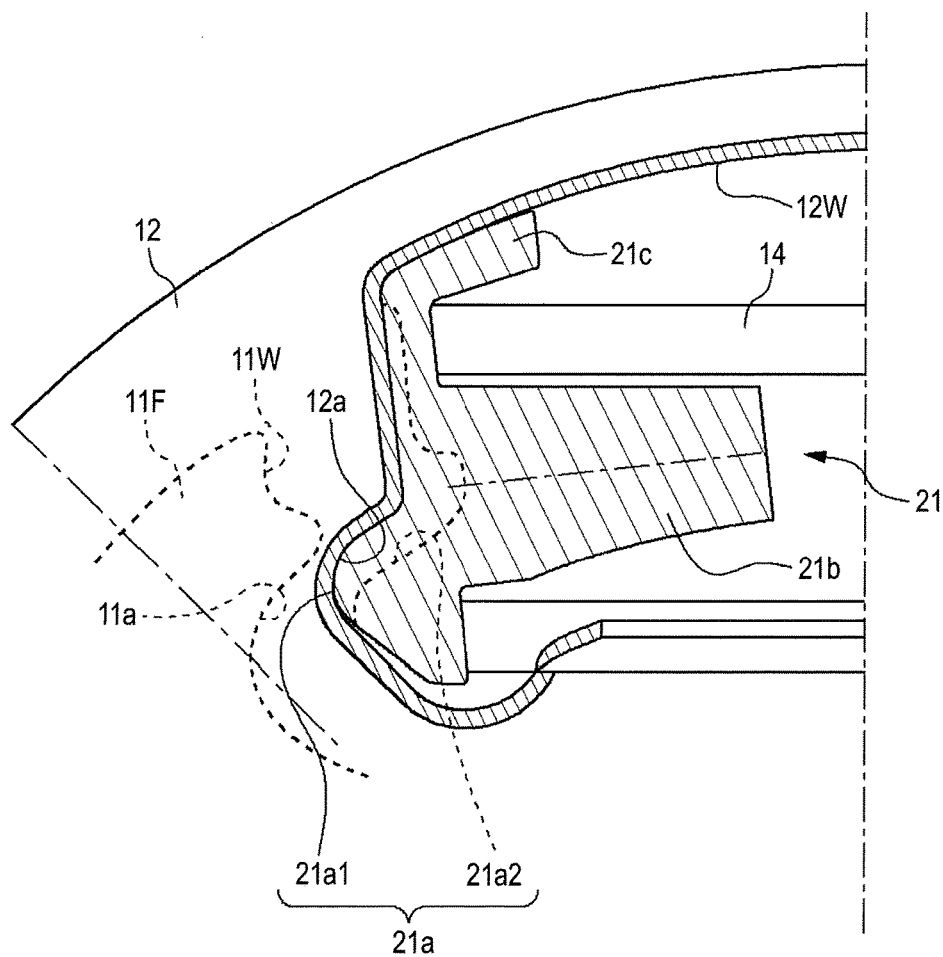
FIG. 4 is a view illustrating a positional relationship of the seat, the flange, and the disk plate in which the damper device illustrated in FIG. 1 is cut by a plane at which the disk plate is positioned and a part of the section is enlarged.

FIG. 1 is a schematic plan view of a damper device according to one embodiment disclosed here. FIG. 2 is a view illustrating a positional relationship between a seat and a flange in which the damper device illustrated in FIG. 1 is cut by a plane at which the flange of a flanged hub is positioned and a part of the section is enlarged, and is a view describing a side on which both ends in a case where relative twist of the flange and a disk plate is not generated, and the flange in a case where the relative twist is generated press the seat. FIG. 3 is a view illustrating a positional relationship between the seat and the flange in which the damper device illustrated in FIG. 1 is cut by a plane at which the flange of the flanged hub is positioned and a part of the section is enlarged, and is a view describing a side on which the flange in a case where the relative twist of the flange and the disk plate is generated does not press the seat. FIG. 4 is a view illustrating a positional relationship of the seat, the flange, and the disk plate in which the damper device illustrated in FIG. 1 is cut by a plane at which the disk plate is positioned and a part of the section is enlarged, and is a view describing a side on which the flange in a case where the relative twist of the flange and the disk plate is the maximum angle does not press the seat.

As illustrated in FIG. 1, a damper device 10 according to the embodiment includes: a flanged hub 11; a disk plate 12 which is disposed to oppose a flange 11F of the flanged hub 11; an elastic member 14 which elastically links the flanged hub 11 and the disk plate 12 in a disk circumferential direction, and in which bending is generated in a case where relative twist of the flange 11F and the disk plate 12 is generated; and a pair of seats 21 and 22 which is provided on both end surfaces in the disk circumferential direction of the elastic member 14. In the embodiment, the flanged hub 11 corresponds to "pressing plate" in the appended claims, and the disk plate 12 corresponds to "rotation plate" in the appended claims.

The damper device 10 according to the embodiment is used, for example, for a clutch disk of a friction clutch installed between an engine and a transmission of a vehicle. In this case, multiple corrugated plate springs in which a facing 51 which can be pinched between a flywheel that is a driving shaft and a pressure plate is fixed to both sides by a rivet 52, are fixed to an outer circumferential portion of the disk plate 12 by the rivet. In addition, a transmission input shaft which is an output shaft is spline-fitted to a hub of the flanged hub 11.

The flanged hub 11 includes a cylindrical hub and the flange 11F which extends in a disk radial direction from an outer circumference of the hub. The disk plate 12 has a shape of a substantial disk, and is disposed to oppose the flange 11F around the hub of the flanged hub 11.

The elastic member 14 is a coil spring in the example illustrated in the drawing, but may be a rubber or the like when the elastic member 14 is an elastic body. In the description hereinafter, there is a case where the elastic member 14 is called a spring.

As illustrated in FIG. 1, in the disk plate 12, a plurality of windows 12W which extend in the disk circumferential direction are formed, and in the flange 11F of the flanged hub 11, a plurality of notches 11W (refer to FIG. 2) which oppose the windows 12W are formed. One group is configured of the opposing window 12W and notch 11W, and is disposed in a state where the elastic member 14 is bending-contracted by a predetermined amount to the window 12W and the notch 11W which configure the group, for each group.

Accordingly, the elastic member 14 is assembled to the flanged hub 11 and the disk plate 12.

As illustrated in FIGS. 1 and 2, the seats 21 and 22 are installed in a state of being pinched between a disk circumferential end surface of the elastic member 14 and a disk circumferential end surface of the window 12W and the notch 11W by a reaction force of the elastic member 14. Therefore, the disk circumferential end surface of the window 12W and the disk circumferential end surface of the notch 11W can abut against the disk circumferential end surface of the elastic member 14 via the seats 21 and 22.

Structures of the pair of the seats 21 and 22 which is installed on both sides in the disk circumferential direction of the elastic member 14 are similar to each other, and hereinafter, the structure will be described using a seat having a reference numeral 21 as a representative example. As illustrated in FIG. 2, in the disk radial center portion on one side surface (right side surface in the example illustrated in the drawing) which abuts against the disk circumferential end surface of the elastic member 14 in the seat 21, a spring holding projection portion 21b which holds the spring 14 that is fitted and inserted to the inner side of the coil of the spring 14 is provided to protrude in the disk circumferential direction with respect to the one side surface. In addition, on the disk radial outer side of the one side surface, a seat outer circumferential holding portion 21c which holds the outer circumference of the spring 14 is provided to protrude in the disk circumferential direction with respect to the one side surface.

Meanwhile, on the disk radial inner side on the other side surface (left side surface in the example illustrated in the drawing) in the seat 21, a projected surface 21a which is sectioned in a semicircular shape that extends in the disk axial direction is integrally provided to protrude in the disk circumferential direction with respect to the other side surface.

In the embodiment, as illustrated in FIG. 2, a part 21a1 which opposes the disk circumferential end surface of the window 12W of the disk plate 12 on the projected surface 21a of the seat 21 is formed to protrude in the disk circumferential direction compared to a part 21a2 which opposes the disk circumferential end surface of the notch 11W of the flanged hub 11.

In addition, as illustrated in FIG. 2, on the disk circumferential end surfaces of the window 12W of the disk plate 12 and the notch 11W of the flanged hub 11, recessed surfaces 12a and 11a having a semicircular shape which is sectional shape that corresponds to the projected surfaces 21a1 and 21a2 to oppose the projected surfaces 21a1 and 21a2 of the seat 21, are respectively formed. The projected surface 21a1 or 21a2 of the seat 21 is fitted and inserted into the recessed surface 12a of the disk plate 12 or the recessed surface 11a of the flanged hub 11, and accordingly, the seat 21 can be held in the disk circumferential direction and in the radial direction by the disk plate 12 or the flanged hub 11.

More specifically, although not being illustrated, in an initial state where the rotation is not generated, the projected surfaces 21a1 of each of the pair of the seats 21 and 22 abut against the recessed surface 12a of the disk plate 12, and a disk radial outer side part on the disk circumferential end surface of the window 12W is inclined by a predetermined angle with respect to a side surface that opposes the pair of the seats 21 and 22. In addition, when a centrifugal force outward in the disk radial direction is applied to the pair of seats 21 and 22 during the rotation, the pair of the seats 21 and 22 respectively rotates only by a predetermined angle with respect to the disk plate 12 around a contact portion between the seat 21 and the disk plate 12, and accordingly, the projected surfaces 21a1 of each of the pair of the seats 21 and 22 are held to be fitted to the recessed surface 12a of the disk plate 12.

Furthermore, as illustrated in FIG. 2, in a case where the relative twist of the flange 11F of the flanged hub 11 and the disk plate 12 is not generated, the outer diameter side part (that is, a part at which a normal line has a component outward in the radial direction) of the projected surfaces 21a2 of each of the pair of the seats 21 and 22 comes into surface-contact with an outer diameter side part (that is, a part at which the normal line has a component inward in the radial direction) of the recessed surface 11a of the flange 11F. Accordingly, it is possible to reliably press and hold the pair of the seats 21 and 22 by the flange 11F.

In addition, in the embodiment, as illustrated in FIGS. 2 and 3, an outer diameter side part of the recessed surface 11a of the flange 11F has a shape positioned closer to the radial outer side as approaching the seat 21 side (right side in the example illustrated in the drawing) in the circumferential direction.

Specifically, for example, as illustrated in FIG. 2, the outer diameter side part of the projected surface 21a2 of the seat 21 and the outer diameter side part of the recessed surface 11a of the flange 11F are respectively formed as a curved surface along an arc, and the center B of the arc is offset to the seat 21 side by a distance D determined in advance with respect to the rotation center A of the flanged hub 11.

Therefore, in a case where the relative twist of the flange 11F of the flanged hub 11 and the disk plate 12 is generated, as illustrated in FIG. 2, an outer diameter side part of the projected surface 21a2 of one seat 21 comes into surface-contact with an outer diameter side part of the recessed surface 11a of the flange 11F, and as illustrated in FIG. 3, a void 31 is formed between the outer diameter side part of the projected surface 21a2 of the other seat 21 and the outer diameter side part of the recessed surface 11a of the flange 11F. In addition, as illustrated in FIG. 4, the void 31 increases as an angle of the relative twist increases. Therefore, when the flange 11F of the flanged hub 11 is repeatedly pressed to and separated from the seat 21, surface sliding is not generated between the outer diameter side part of the projected surface 21a2 of the seat 21 and the outer diameter side part of the recessed surface 11a of the flange 11F.

Next, an operation of the damper device 10 configured in this manner will be described.

Figure 7:
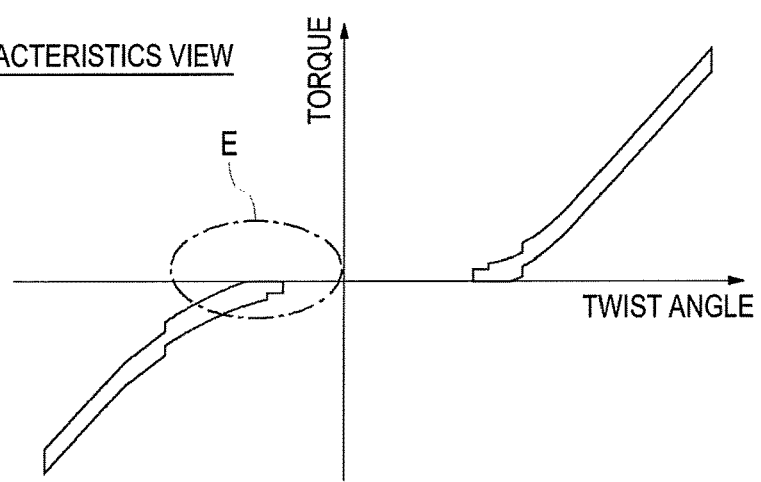
FIG. 7 is a view illustrating twist characteristics of the damper device.

When connecting the clutch, the torque from the engine is input to the disk plate 12 via the facing 51 and the corrugated plate spring, is transmitted to the flanged hub 11 via the elastic member 14 from the disk plate 12, and is output to the transmission from the flanged hub 11. At this time, while bending-contracting the elastic member 14 in accordance with a torque value input to the flanged hub 11 and the disk plate 12, relative twist rotation is performed by the twist characteristics illustrated in FIG. 7, and accordingly, a buffering action is operated with respect to the torque transmission to the flanged hub 11 from the disk plate 12.

In addition, although not being illustrated, in the damper device 10, the damper device 10 itself is provided with a known hysteresis structure, gives hysteresis to twist characteristics when the flanged hub 11 and the disk plate 12 are relatively twisted and rotated, and an attenuation action is operated with respect to the torque transmission to the flanged hub 11 from the disk plate 12. As the hysteresis structure, it is possible to employ, for example, a configuration described in paragraph 0013 of Japanese Patent No. 3381396.

In the embodiment, as illustrated in FIG. 2, when the rotation is applied to the damper device 10, the pair of the seats 21 and 22 rotates only by a predetermined angle around the contact portion between the seat 21 and the disk plate 12 by receiving a centrifugal force outward in the disk radial direction. Accordingly, before the twist characteristics by the bending contraction of the elastic member 14, the twist characteristics by the rotation of the pair of the seats 21 and 22 are obtained.

As illustrated in FIG. 2, as the pair of the seats 21 and 22 rotates only by a predetermined angle with respect to the disk plate 12, the projected surfaces 21a1 of each of the pair of the seats 21 are fitted to the recessed surface 12a of the disk plate 12. Accordingly, it is possible to reliably hold the pair of the seats 21 and 22.

Next, as illustrated in FIG. 2, in a case where the relative twist of the flange 11F of the flanged hub 11 and the disk plate 12 is not generated, the outer diameter side part of the projected surfaces 21a2 of each of the pair of the seats 21 and 22 comes into surface-contact with the outer diameter side part of the recessed surface 11a of the flange 11F. Accordingly, it is possible to reliably press and hold the seat 21 by the flange 11F.

Figure 5:
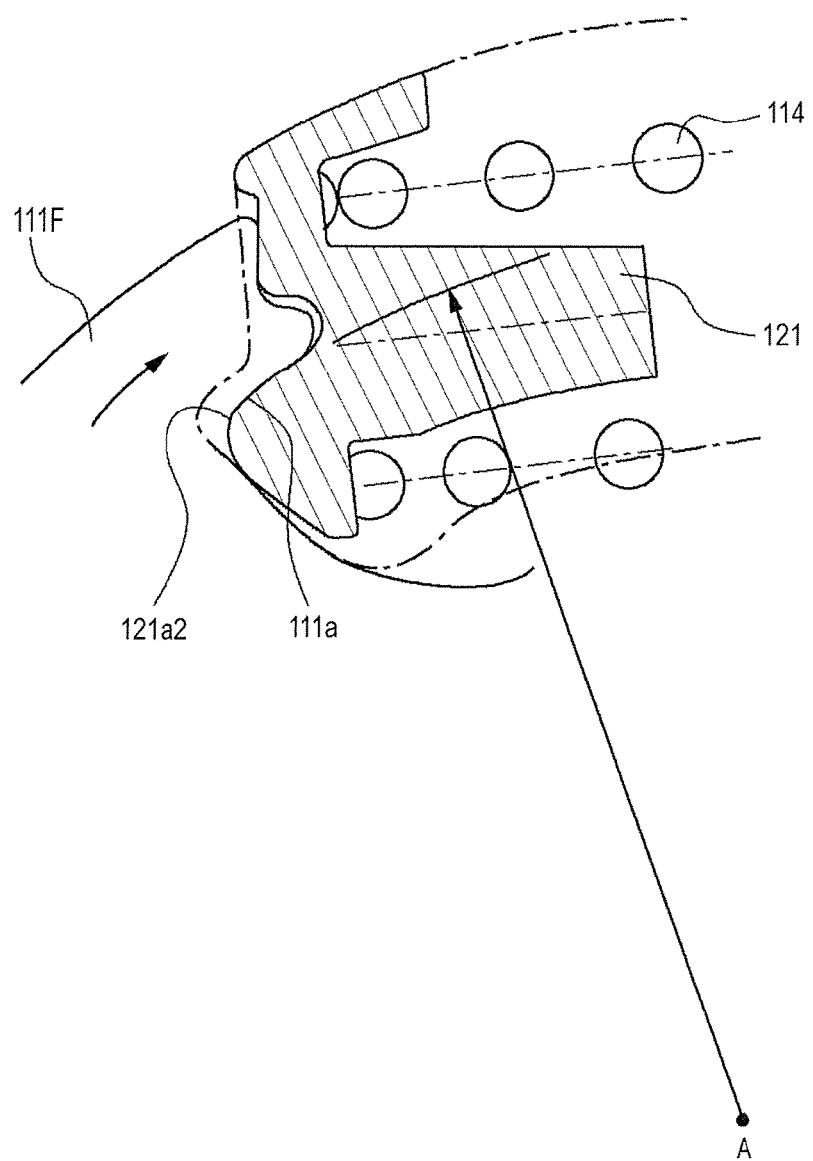
FIG. 5 is a view illustrating a positional relationship between the seat and the flange in a damper device according to a comparative example.
Figure 6:
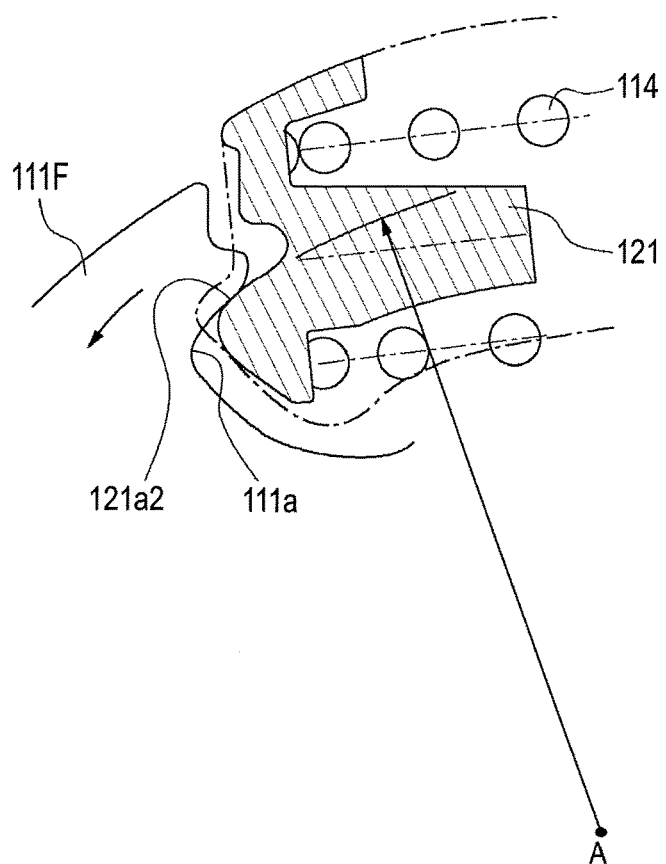
FIG. 6 is a view illustrating a positional relationship between the seat and the flange in the damper device according to the comparative example.
Figure 8:
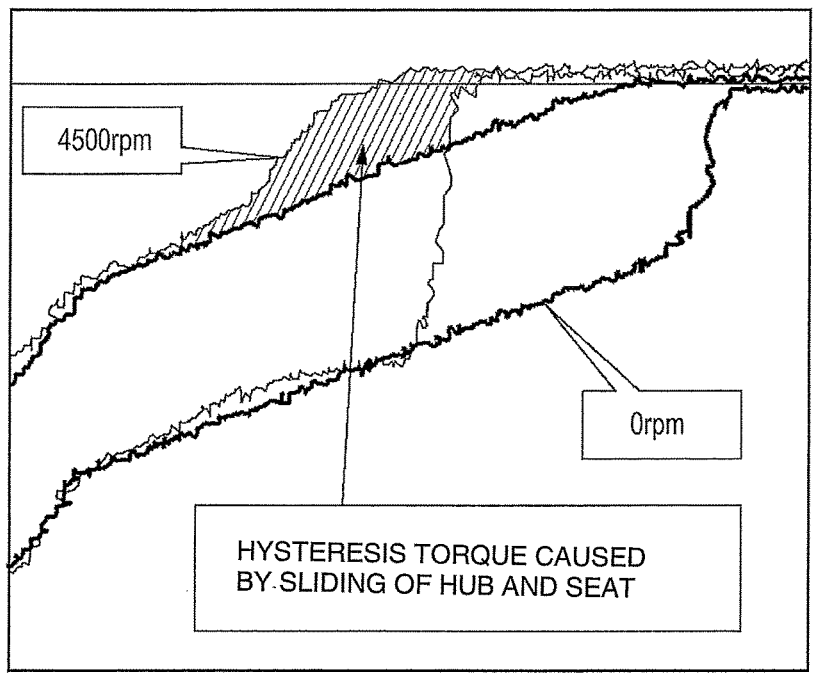
FIG. 8 is a view describing hysteresis torque of the damper device according to the comparative example.

However, as a comparative example, as illustrated in FIGS. 5 and 6, a damper device in which an outer diameter side part of a projected surface 121a2 of a seat 121 and an outer diameter side part of a recessed surface 111a of a flange 111F are respectively formed as a curved surface along the arc around the rotation center A of the flange 111F, is considered. In the damper device of the comparative example, when the flange 111F is repeatedly pressed to and separated from the seat 121, the outer diameter side part of the recessed surface 111a of the flange 111F and the outer diameter side part of the projected surface 121a2 of the seat 121 continue to be in contact with each other, and accordingly, surface sliding is generated by the contact part. Since the centrifugal force applied to the seat 121 increases as the rotational speed of the damper device increases, the surface sliding also increases. By the influence of the surface sliding, in the rotary vibration absorption in the vicinity of a part at which the spring 14 starts to bend (corresponding to a region surrounded by a one-dot chain line to which a reference numeral E is attached in FIG. 7), as illustrated in FIG. 8, unintentional hysteresis torque which is different from that is predicted at the time of designing is generated.

Figure 9:
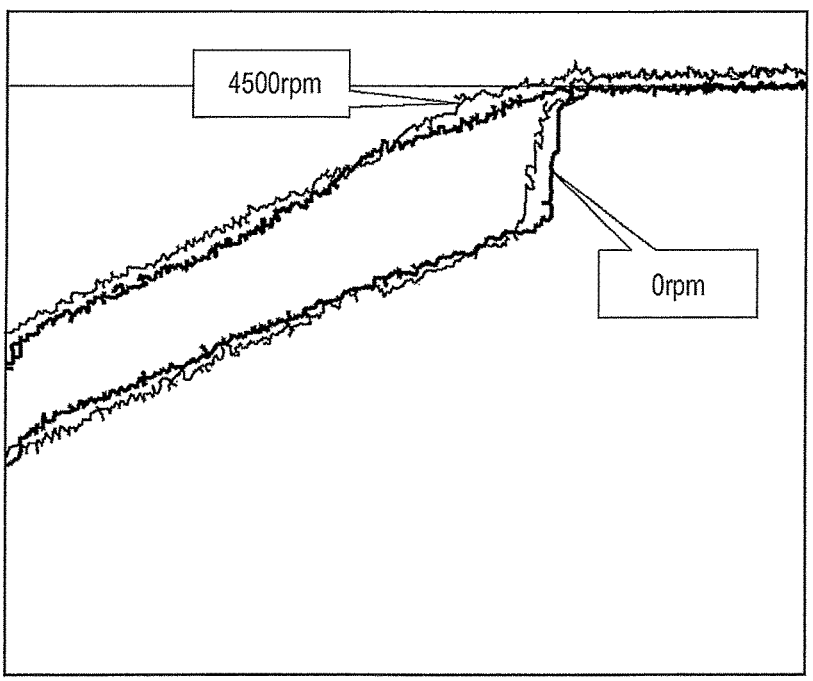
FIG. 9 is a view describing hysteresis torque of the damper device according to one embodiment of the disclosure.

Meanwhile, as illustrated in FIG. 2, the outer diameter side part of the projected surface 21a2 of one seat 21 and the outer diameter side part of the recessed surface 11a of the flange 11F come into surface-contact with each other in the embodiment, in a case where the relative twist of the flange 11F of the flanged hub 11 and the disk plate 12 is generated, but as illustrated in FIG. 3, the void 31 is formed between the outer diameter side part of the projected surface 21a2 of the other seat 21 and the outer diameter side part of the recessed surface 11a of the flange 11F. In addition, as illustrated in FIG. 4, the void 31 increases as the angle of the relative twist increases. Therefore, even when the flanged hub 11 is repeatedly pressed to and separated from the seat 21, the surface sliding is not generated between the outer diameter side part of the projected surface 21a2 of the seat 21 and the outer diameter side part of the recessed surface 11a of the flange 11F, and as illustrated in FIG. 9, in the rotary vibration absorption in the vicinity of a part at which the spring 14 starts to bend, hysteresis torque similar to that is predicted at the time of designing can be realized.

As described above, according to the embodiment, the outer diameter side part of the projected surface 21a2 of each of the pair of the seats 21 and 22 and the outer diameter side part of the recessed surface 11a of the flange 11F come into surface-contact with each other in a case where the relative twist of the flange 11F and the disk plate 12 is generated, but the outer diameter side part of the projected surface 21a of one seat 21 and the outer diameter side part of the recessed surface 11a of the flange 11F come into surface-contact with each other in a case where the relative twist is not generated, the void 31 is formed between the outer diameter side part of the projected surface 21a2 of the other seat 21 and the outer diameter side part of the recessed surface 11a of the flange 11F, and the void 31 increases as an angle of the relative twist increases. Therefore, even in a case where the flange 11F is repeatedly pressed to and separated from the seat 21, surface sliding is not generated between the outer diameter side part of the projected surface 21a2 of the seat 21 and the outer diameter side part of the recessed surface 11a of the flange 11F. Accordingly, at the time when the elastic member 14 starts to bend, generation of unintentional hysteresis torque can be suppressed.

In addition, in the above-described embodiment, as illustrated in FIG. 2, the outer diameter side part of the projected surface 21a2 of the seat 21 and the outer diameter side part of the recessed surface 11a of the flange 11F are respectively formed as a curved surface along the arc, and the center B of the arc is offset to the seat 21 side by the predetermined distance D with respect to the rotation center A of the flanged hub 11, but when the outer diameter side part of the recessed surface 11a of the flange 11F has a shape positioned closer to the radial outer side as approaching the seat 21 side in the circumferential direction, the embodiment is not limited to the aspect.

Specifically, for example, the outer diameter side part of the projected surface 21a2 of the seat 21 and the outer diameter side part of the recessed surface 11a of the flange 11F may be respectively formed as a flat surface, and the flat surface may be inclined to be separated toward the radial outer side as approaching the seat 21 side with respect to a tangential direction of a rotary disk of the flange 11F. In this aspect, the outer diameter side part of the projected surface 21a2 of the seat 21 and the outer diameter side part of the recessed surface 11a of the flange 11F come into surface-contact with each other in a case where the flange 11F presses the seat 21 and the elastic member 14 is bent, but the void 31 is formed between the outer diameter side part of the projected surface 21a2 of the seat 21 and the outer diameter side part of the recessed surface 11a of the flange 11F in a case where the flange 11F is separated from the seat 21 and the elastic member 14 is not bent, and the void 31 increases as an angle made of the flange 11F and the seat 21 increases. Therefore, an action effect similar to that of the above-described embodiment can be achieved.

A damper device according to an aspect of this disclosure includes: a pressing plate; a rotation plate which is, disposed to oppose the pressing plate; an elastic member which elastically links the pressing plate and the rotation plate in a circumferential direction, and in which bending is generated in a case where relative twist of the pressing plate and the rotation plate is generated; and a pair of seats which is provided on both end surfaces in the circumferential direction of the elastic member, in which the seat has a projected surface which protrudes in the circumferential direction on the pressing plate side, in which the pressing plate has a recessed surface that corresponds to the projected surface, in which an outer diameter side part of the projected surface of each of the pair of the seats and an outer diameter side part of the recessed surface of the pressing plate come into surface-contact with each other in a case where the relative twist is not generated, in which the outer diameter side part of the projected surface of one seat and the outer diameter side part of the recessed surface of the pressing plate come into surface-contact with each other, and a void is formed between the outer diameter side part of the projected surface of the other seat and the outer diameter side part of the recessed surface of the pressing plate, in a case where the relative twist is generated, and in which the void increases as an angle of the relative twist increases.

According to the aspect of this disclosure, the outer diameter side part of the projected surface of each of the pair of the seats and the outer diameter side part of the recessed surface of the pressing plate come into surface-contact with each other in a case where the relative twist of the pressing plate and the rotation plate is not generated, but the outer diameter side part of the projected surface of the one seat and the outer diameter side part of the recessed surface of the pressing plate come into surface-contact with each other, and a void is formed between the outer diameter side part of the projected surface of the other seat and the outer diameter side part of the recessed surface of the pressing plate in a case where the relative twist is generated, and the void increases as an angle of the relative twist increases. Therefore, even in a case where the pressing plate is repeatedly pressed to and separated from the seat, surface sliding is not generated between the outer diameter side part of the projected surface of the seat and the outer diameter side part of the recessed surface of the pressing plate. Accordingly, at the time when the elastic member starts to bend, generation of unintentional hysteresis torque can be suppressed.

In the damper device according to the aspect of this disclosure, the outer diameter side part of the recessed surface of the pressing plate may have a shape so as to be positioned on a radial outer side as approaching the seat side in the circumferential direction.

In the damper device according to the aspect of this disclosure, the outer diameter side part of the projected surface of the seat and the outer diameter side part of the recessed surface of the pressing plate may be respectively formed as a curved surface along an arc, and the center of the arc may be offset to the seat side with respect to the rotation center of the pressing plate.

In the damper device according to the aspect of this disclosure, the outer diameter side part of the projected surface of the seat and the outer diameter side part of the recessed surface of the pressing plate may be respectively formed as a flat surface, and the flat surface may be inclined to be separated toward the radial outer side as approaching the seat side with respect to a tangential direction of a rotary disk of the pressing plate.

According to the aspect of this disclosure, in the damper device, it is possible to suppress generation of unintentional hysteresis torque.

In addition, in the above-described embodiment, the flanged hub 11 corresponds to "pressing plate" in the appended claims, and the disk plate 12 corresponds to "rotation plate" in the appended claims, but the embodiment disclosed here is not limited thereto. For example, the disk plate 12 may correspond to "pressing plate" in the appended claims, and the flanged hub 11 may correspond to "rotation plate" in the appended claims. In this case, torque input to the flanged hub 11 is transmitted to the disk plate 12 via the elastic member 14 while buffering by bending contraction of the elastic member 14, but an action effect similar to that of the above-described embodiment can also be achieved in the aspect.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damper device comprising:
    a pressing plate;
    a rotation plate which is disposed to oppose the pressing plate;
    an elastic member which elastically links the pressing plate and the rotation plate in a circumferential direction, and in which bending is generated in a case where relative twist of the pressing plate and the rotation plate is generated; and
    a pair of seats provided on both end surfaces in the circumferential direction of the elastic member,
    wherein each of the pair of seats has a projected surface which protrudes in the circumferential direction on the pressing plate side,
    wherein the pressing plate has a recessed surface that corresponds to the projected surface,
    wherein an outer diameter side part of the projected surface of each of the pair of the seats and an outer diameter side part of the recessed surface of the pressing plate come into surface-contact with each other in a case where the relative twist is not generated,
    wherein the outer diameter side part of the projected surface of a first seat of the pair of seats and the outer diameter side part of the recessed surface of the pressing plate come into surface-contact with each other, and a void is formed between the outer diameter side part of the projected surface of a second seat of the pair of seats and the outer diameter side part of the recessed surface of the pressing plate, in a case where the relative twist is generated,
    wherein the void increases as an angle of the relative twist increases,
    wherein the outer diameter side part of the projected surface of each of the pair of seats and the outer diameter side part of the recessed surface of the pressing plate are respectively formed as a curved surface along an arc, and
    wherein the center of the arc is offset to a seat side with respect to the rotation center of the pressing plate.

2. The damper device according to claim 1,
    wherein the outer diameter side part of the recessed surface of the pressing plate has a shape so as to be positioned closer to a radial outer side as approaching the seat side in the circumferential direction.

* * * * *